United States Patent
Zhang

(10) Patent No.: US 7,562,653 B2
(45) Date of Patent: Jul. 21, 2009

(54) METHOD FOR DETECTING A CYLINDER-SPECIFIC AIR/FUEL RATIO IN AN INTERNAL COMBUSTION ENGINE

(75) Inventor: Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 11/597,313

(22) PCT Filed: Mar. 30, 2005

(86) PCT No.: PCT/EP2005/051427

§ 371 (c)(1),
(2), (4) Date: Nov. 21, 2006

(87) PCT Pub. No.: WO2005/116433

PCT Pub. Date: Dec. 8, 2005

(65) Prior Publication Data

US 2007/0240694 A1  Oct. 18, 2007

(30) Foreign Application Priority Data

May 28, 2004 (DE) ................. 10 2004 026 176

(51) Int. Cl.
*F02D 41/14* (2006.01)
(52) U.S. Cl. ...................... 123/673; 701/109
(58) Field of Classification Search ............. 123/559.2, 123/564, 673; 701/109
See application file for complete search history.

(56) References Cited

U.S. PATENT DOCUMENTS

| | | | |
|---|---|---|---|
| 5,813,389 A * | 9/1998 | Kitamura et al. ............ | 123/673 |
| 6,276,349 B1 * | 8/2001 | Kofler et al. ................ | 123/673 |
| 6,378,308 B1 * | 4/2002 | Pfluger ....................... | 60/612 |
| 6,675,787 B2 * | 1/2004 | Damitz et al. ............... | 123/673 |
| 6,910,471 B2 * | 6/2005 | Deibert et al. .............. | 123/673 |
| 7,337,771 B2 * | 3/2008 | Bornitz et al. .............. | 123/673 |
| 2002/0026930 A1 | 3/2002 | Ueno et al. | |
| 2002/0096157 A1 * | 7/2002 | Damitz et al. ............... | 123/673 |
| 2004/0134462 A1 * | 7/2004 | Strom et al. ................ | 123/294 |

FOREIGN PATENT DOCUMENTS

| | | |
|---|---|---|
| DE | 199 03 721 C1 | 7/2000 |
| DE | 102 06 402 C1 | 4/2003 |
| DE | 102 43 342 B3 | 1/2004 |
| EP | 0 643 213 A1 | 3/1995 |
| WO | WO 96/35048 | 11/1996 |

OTHER PUBLICATIONS

Kevin J. Bush, Neil J. Adams, Sanjay Dua and Craig R. Markyvech, "Automatic Control of Cylinder by Cylinder Air-Fuel Mixture Using a Proportional Exhaust Gas Sensor", SAE Transactions, Journal of Engines, Warrendale, PA, US, vol. 13, 1994 pp. 73-86, XP-000858036.

* cited by examiner

*Primary Examiner*—Erick Solis
(74) *Attorney, Agent, or Firm*—King & Spalding L.L.P.

(57) ABSTRACT

An internal combustion engine comprising several cylinders provided with injection valves associated with the cylinders admeasuring fuel. An exhaust gas probe is arranged in an exhaust gas tract and the measuring signal thereof is characteristic for the air/fuel ratio in the respective cylinder. A sensing crankshaft angle is determined in relation to a reference position of the piston of the respective cylinder in order to detect the measuring signal according to a variable characterizing air/fuel ratio in the respective cylinder, or an ambient pressure or a degree of opinion of a bypass valve of a bypass associated with a turbine in which the exhaust gas tract is arranged. The measuring signal is detected at the sensing crankshaft angle and allocated to the respective cylinder.

8 Claims, 4 Drawing Sheets

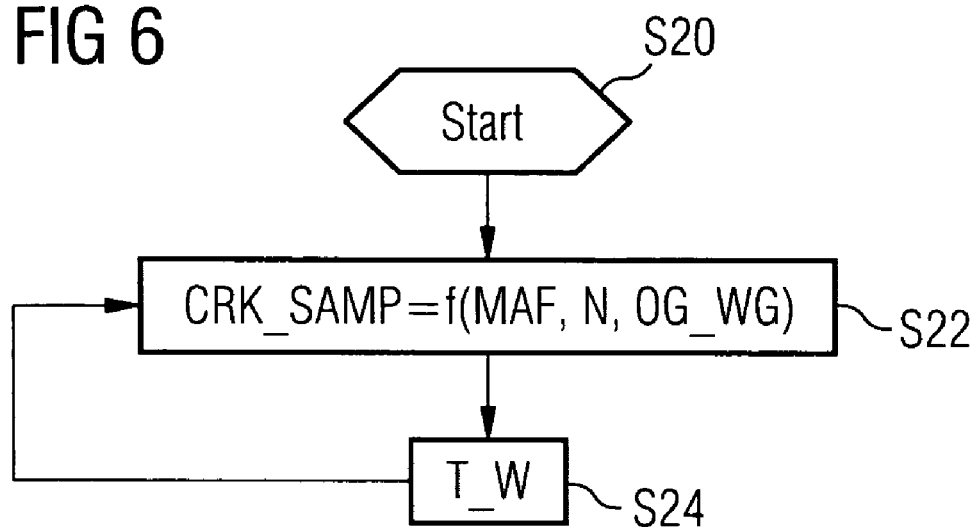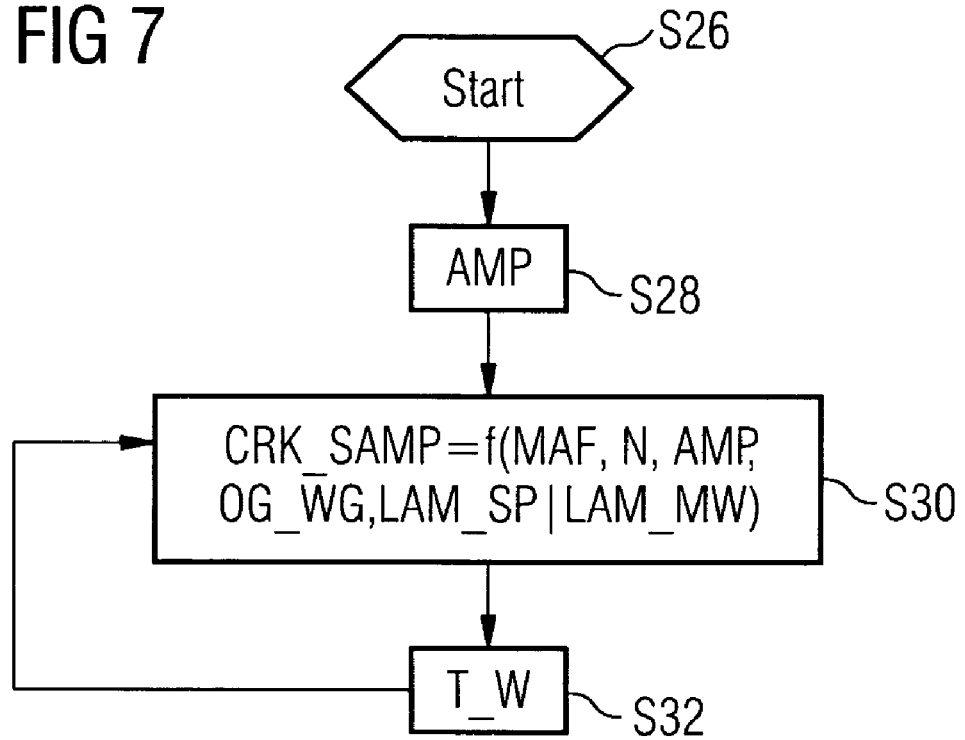

US 7,562,653 B2

METHOD FOR DETECTING A CYLINDER-SPECIFIC AIR/FUEL RATIO IN AN INTERNAL COMBUSTION ENGINE

CROSS REFERENCE TO RELATED APPLICATIONS

This application is the US National Stage of International Application No. PCT/EP2005/051427, filed Mar. 30, 2005 and claims the benefit thereof. The International Application claims the benefits of German Patent application No. 10 2004 026 176.8 filed May 28, 2004. All of the applications are incorporated by reference herein in their entirety.

FIELD OF INVENTION

The invention relates to a method for detecting a cylinder-specific air/fuel ratio in an internal combustion engine with a number of cylinders and injection valves assigned to the cylinders, which meter fuel. An exhaust gas probe is disposed in an exhaust gas tract and its measuring signal is characteristic of the air/fuel ratio in the respective cylinder.

BACKGROUND OF THE INVENTION

Increasingly stringent statutory provisions relating to permitted pollutant emissions from motor vehicles, in which internal combustion engines are disposed, mean that pollutant emissions have to be kept as low as possible during operation of the internal combustion engine. This can be achieved on the one hand by reducing the pollutant emissions, which result during combustion of the air/fuel mixture in the respective cylinder of the internal combustion engine. Exhaust gas post-treatment systems can also be used in internal combustion engines, to convert the pollutant emissions produced during the combustion process of the air/fuel mixture in the respective cylinders to harmless substances. Exhaust gas catalytic converters are used for this purpose, converting carbon monoxide, hydrocarbons and nitrous oxides to harmless substances. Both the specific influencing of the production of pollutant emissions during combustion and the conversion of pollutant components in a highly efficient manner using an exhaust gas catalytic converter require a very precisely set air/fuel ratio in the respective cylinder.

A method for the cylinder-selective regulation of an air-fuel mixture to be burned for an internal combustion engine with a number of cylinders is known from DE 199 03 721 C1, wherein the lambda values for different cylinders or cylinder groups are sensed and regulated separately. A probe/evaluation unit is provided for this purpose, in which the exhaust gas probe signal is evaluated with time resolution, thereby determining a cylinder-selective lambda value for each cylinder in the internal combustion engine. Each cylinder is assigned an individual regulator, configured as a PI or PID regulator, the controlled variable of which is a cylinder-specific lambda value and the reference variable of which is a cylinder-specific target value for the lambda. The manipulated variable of the respective regulator then influences fuel injection in the respectively assigned cylinder.

The quality of cylinder-specific lambda regulation depends to a large degree on how precisely the measuring signal of the exhaust gas probe detected at the respective sampling time is assigned to the exhaust gas of the respective cylinder.

An internal combustion engine with a number of cylinders and injection valves assigned to the cylinders is known from EP 0 643 213 A1. An exhaust gas probe is disposed in the exhaust gas tract and its measuring signal is characteristic of the air/fuel ratio in the respective cylinders. The exhaust gas probe generates a measuring signal, which is converted to digital values by means of an A/D converter and stored in a buffer unit. To assign the respective fuel ratio to the respective cylinder, the respective buffered value to be read out is determined as a function of whether a desired air/fuel ratio is leaner than the stoichiometric air/fuel ratio. According to a further embodiment the buffered value to be read out is determined as a function of the atmospheric pressure.

It is known from US 2002/0026930 A1 that a measuring signal from an exhaust gas probe can be sampled and one of the sampled values can be selected as a function of the engine speed, engine load and a selected operating mode, which can for example be a stoichiometric mode, a pre-mix combustion mode and a layer mode.

SUMMARY OF INVENTION

The object of the invention is to create a method, which allows precise detection of the air/fuel ratio to be assigned to the respective cylinder of an internal combustion engine in a simple manner.

The object is achieved by the features of the independent claims. Advantageous embodiments of the invention are characterized in the subclaims.

The invention is characterized by a method for detecting a cylinder-specific air/fuel ratio in an internal combustion engine with a number of cylinders and injection values assigned to the cylinders, which meter fuel, with an exhaust gas probe being disposed in an exhaust gas tract and its measuring signal being characteristic of the air/fuel ratio in the respective cylinder. A sampled crankshaft angle in relation to a reference position of the piston of the respective cylinder is determined to detect the measuring signal as a function of an opening angle of a bypass valve of a bypass to a turbine, which is disposed in the exhaust gas tract. When the crankshaft angle reaches the sampled crankshaft angle, the measuring signal is detected and assigned to the respective cylinder. Naturally the crankshaft angle and the sampled crankshaft angle can also be expressed as a corresponding time signal to the same effect.

The invention makes simple use of the knowledge that the response time of the exhaust gas probe is a function of the absolute pressure acting on it. The absolute pressure acting on the exhaust gas probe is the exhaust gas back-pressure prevailing in the exhaust gas tract in the region of the exhaust gas probe. It is a fact that, the exhaust gas back-pressure is influenced to a large extent by the opening angle of the bypass valve. The response time of the exhaust gas probe is influenced due to a pressure-dependent diffusion of the oxygen molecules in a corresponding chamber of the exhaust gas probe.

According to an advantageous embodiment of the invention the sampled crankshaft angle in relation to a reference position of the piston of the respective cylinder is determined to detect the measuring signal as a function of an ambient pressure. This makes particular use of the knowledge that, particularly when the internal combustion engine is in the same load state, the exhaust gas back-pressure is a function of ambient pressure, in other words the pressure prevailing in the region around the internal combustion engine.

According to a further advantageous embodiment of the invention, the sampled crankshaft angle is determined as a function of a variable characterizing the air/fuel ratio in the respective cylinder. This allows the dynamic of the exhaust gas probe to be taken into account in a particularly favorable manner, as it is a function of the air/fuel ratio in the respective cylinder.

In this context it is particularly advantageous, if the sampled crankshaft angle is determined as a function of whether or not the air/fuel ratio in the respective cylinder corresponds approximately to the stoichiometric air/fuel ratio. This makes use of the knowledge that the dynamic of the exhaust gas probe differs significantly as a function of whether or not the air/fuel ratio in the respective cylinder corresponds approximately to the stoichiometric air/fuel ratio or is correspondingly super- or sub-stoichiometric. It has proven in particular that this narrow range around the stoichiometric air/fuel ratio is approximately in the range $\lambda=0.97$ to 1.03. It has also proven that this changed dynamic in the narrow window around the stoichiometric air/fuel ratio in the respective cylinder is due to recharge processes in a chamber of the linear lambda probe, in particular to a changed distribution of the oxygen in the chamber.

BRIEF DESCRIPTION OF THE DRAWINGS

Exemplary embodiments of the invention are described in more detail below with reference to the schematic drawings, in which:

FIG. 6 shows a flow diagram of a fourth embodiment of a program for determining a sampled crankshaft angle, FIG. 7 shows a flow diagram of a fifth embodiment of a program for determining a sampled crankshaft angle.

Elements of the same structure and function are identified with the same reference characters in all the figures.

DETAILED DESCRIPTION OF INVENTION

Figure 1:
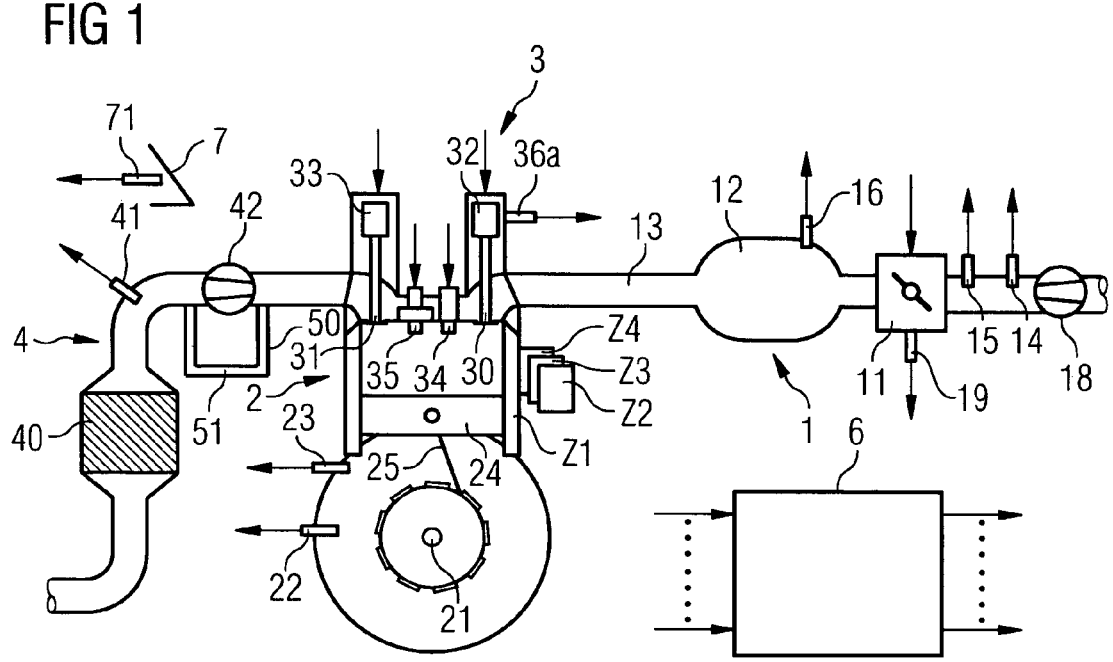
FIG. 1 shows an internal combustion engine with a control facility.

An internal combustion engine (FIG. 1) has an intake tract 1, an engine block 2, a cylinder head 3 and an exhaust gas tract 4. The intake tract 1 preferably has a throttle valve 11, also a manifold 12 and an intake pipe 13, which leads to a cylinder Z1 via an inlet duct into the engine block 2. The engine block 2 also has a crankshaft 21, which is coupled via a connecting rod 25 to the piston 24 of the cylinder Z1.

The cylinder head 3 has a valve gear mechanism with a gas inlet valve 30, a gas outlet valve 31 and valve drives 32, 33. The cylinder head 3 also has an injection valve 34 and a spark plug 35. Alternatively the injection valve can also be disposed in the intake pipe 13.

The exhaust gas tract 4 has an exhaust gas catalytic converter 40, preferably configured as a three-way catalytic converter. An exhaust gas turbocharger can also be provided, having a turbine 42, which is disposed in the exhaust gas tract 4, a bypass duct 50 to the turbine 42 with a bypass valve 51 and a compressor 18, which is disposed in the intake tract 1.

A control facility 6 is also provided, to which sensors are assigned, which detect different measured variables and determine the measured value of the measured variable in each instance. The control facility 6 controls the final control elements by means of corresponding actuators as a function of at least one of the measured variables.

The sensors are a pedal position sensor 71, which detects the position of an accelerator pedal 7, an air mass sensor 14, which detects an air mass flow upstream of the throttle valve 11, a temperature sensor 15, which detects the intake air temperature, a pressure sensor 16, which detects the intake pipe pressure, a crankshaft angle sensor 22, which detects a crankshaft angle, to which a speed N is then assigned, a further temperature sensor 23, which detects a coolant temperature, a throttle valve sensor 19, which detects the opening angle of the throttle valve 11, and an exhaust gas probe 41, which detects a residual oxygen content of the exhaust gas and whose measuring signal is characteristic of the air/fuel ratio in the cylinder Z1. The exhaust gas probe 41 is preferably configured as a linear lambda probe, thus generating a measuring signal proportional to the air/fuel ratio over a wide air/fuel ratio range.

Any sub-set of said sensors or even additional sensors can be present, depending on the embodiment of the invention.

The final control elements are for example the throttle valve 11, the gas inlet and gas outlet valves 30, 31, the injection valve 34, the spark plug 35 or the bypass valve 51.

As well as the cylinder Z1, further cylinders Z2-Z4 can also be provided, to which corresponding final control elements are also assigned. The internal combustion engine can thus have six cylinders for example, three cylinders respectively being assigned to an exhaust gas unit. An exhaust gas probe 41 is preferably assigned to each exhaust gas unit.

Figure 2:
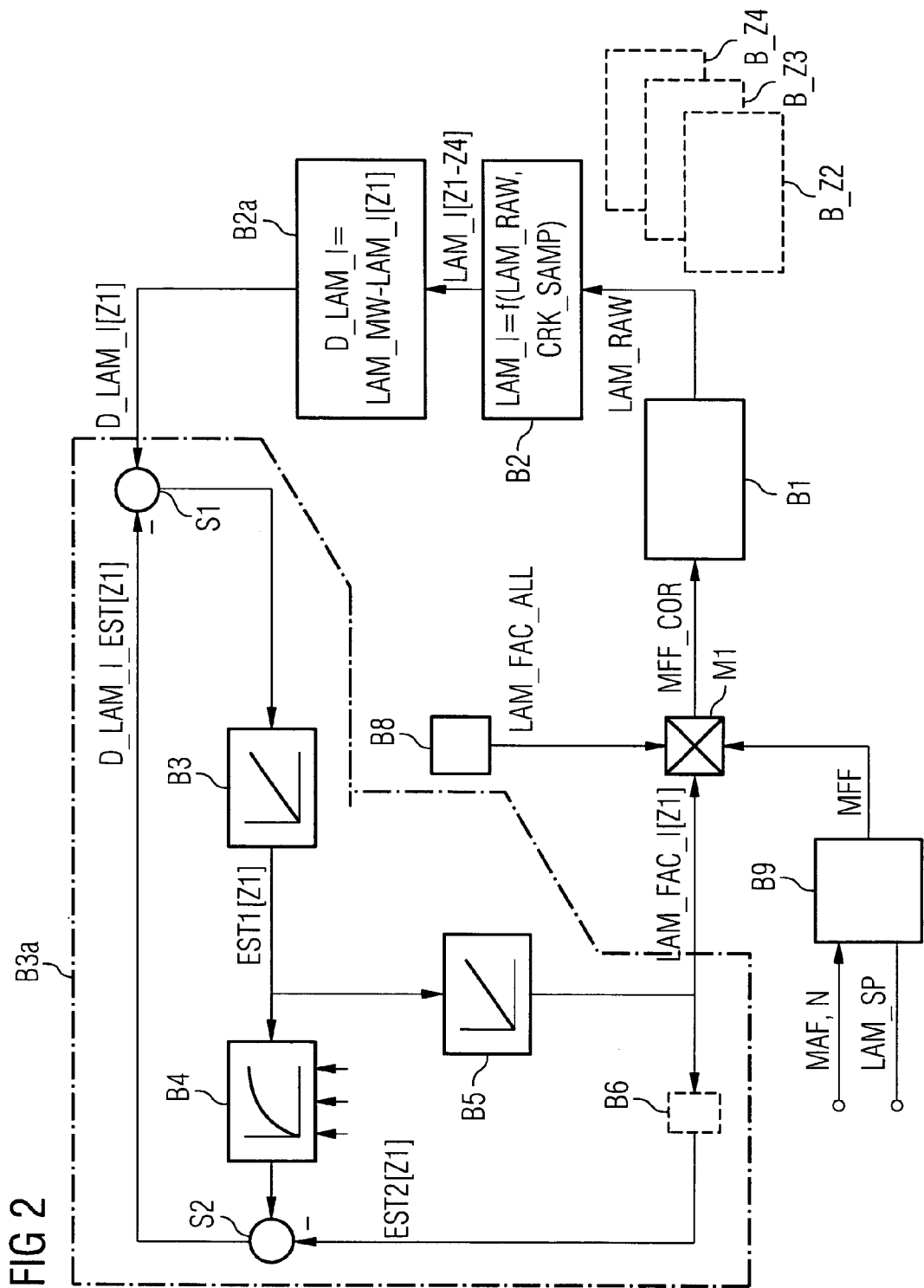
FIG. 2 shows a block circuit diagram of the control facility.

A block circuit diagram of parts of the control facility 6, which can also be referred to as a device for controlling the internal combustion engine, is shown in FIG. 2.

A block B1 corresponds to the internal combustion engine. An air/fuel ratio LAM_RAW detected by the exhaust gas probe 41 is fed to a block 2. Then at respectively determined sampled crankshaft angles CRK_SAMP in relation to a reference position of the respective piston of the respective cylinder Z1 to Z4 an assignment takes place in block B2 of the respective currently detected air/fuel ratio at this time, which is derived from the measuring signal of the exhaust gas probe 41, to the respective air/fuel ratio of the respective cylinder Z1 to Z4, thus assigning the air/fuel ratio LAM_I[Z1-Z4] detected in a cylinder-specific manner.

The reference position of the respective piston 24 is preferably its top dead center. The determination of the sampled crankshaft angle CRK_SAMP is described in more detail below based on the programs described below.

A mean air/fuel ratio LAM_MW is determined in a block B2$a$ by averaging the air/fuel ratios LAM_I[Z1-Z4] detected in a cylinder-specific manner. In block B2$a$ an actual value D_LAM_I[Z1] of a cylinder-specific air/fuel ratio deviation is also determined from the difference between the mean air/fuel ratio LAM_MW and the air/fuel ratio LAM_I [Z1] determined in a cylinder-specific manner. This is then fed to a regulator, which is formed by block B3$a$.

In a summing point S1 the difference between the actual value D_LAM_I[Z1] and an estimated value D_LAM_I_EST [Z1] of the cylinder-specific air/fuel ratio deviation is determined and then assigned to a block B3, which is part of an observer and comprises an integration element, which integrates the variable present at its input. The I-element of block B3 then provides a first estimated value EST1 [Z1] at its output.

The first estimated value EST1[Z1] is then fed to a delay element, which is also part of the observer and is configured in block B4. The delay element is preferably configured as a PT1 element. The first estimated values EST1[Z2-Z4] relating to the further cylinders [Z2-Z4] respectively are optionally also fed to the delay element. The first estimated value EST1[Z1] forms a status variable of the observer.

The first estimated value EST1[Z1] is also fed to a block B5, in which a further integrator element is configured, which integrates the first estimated value EST1[Z1] and then generates a cylinder-specific lambda regulation factor LAM_FAC_I[Z1] as a manipulated variable of the regulator at its output.

In a block B6 a second estimated value EST2[Z1] is determined as a function of the cylinder-specific lambda regulation factor LAM_FAC_I[Z1]. This can be done particularly simply by aligning the second estimated value EST2[Z1] with the cylinder-specific lambda regulation factor LAM_FAC_I[Z1]. The difference between the first estimated value EST1[Z1] filtered by way of the delay element of block B4 and the second estimated value EST2[Z1] is then formed in the summing point S2 and returned as the estimated value D_LAM_I_EST[Z1] of the cylinder-specific air/fuel ratio deviation to the summing point S1 and subtracted here from the actual value D_LAM_I[Z1] of the respective cylinder-specific air/fuel ratio deviation and thus fed back and then input back into block B3.

In a block B8 a lambda regulator is provided, the reference variable of which is an air/fuel ratio predetermined for all the cylinders of the internal combustion engine and the controlled variable of which is the mean air/fuel ratio LAM_MW. The manipulated variable of the lambda regulator is a lambda regulation factor LAM_FAC_ALL. The lambda regulator therefore has the task of ensuring that the predetermined air/fuel ratio is set across all the cylinders Z1 to Z4 of the internal combustion engine.

Alternatively this can also be achieved by determining the actual value D_LAM_I of the cylinder-specific air/fuel ratio deviation in block B2 from the difference between the air/fuel ratio predetermined for all the cylinders Z1 to Z4 of the internal combustion engine and the cylinder-specific air/fuel ratio LAM_I[Z1-Z4]. There is then no need for the third regulator of block B8.

In a block B9 a fuel mass to be metered MFF is determined as a function of an air mass flow MAF into the respective cylinder Z1 to Z4 and optionally the speed N and a target value LAM_SP of the air/fuel ratio for all cylinders Z1-Z4.

In the multiplication point M1 a corrected fuel mass to be metered MFF_COR is determined by multiplying the fuel mass to be metered MFF, the lambda regulation factor LAM_FAC_ALL and the cylinder-specific lambda regulation factor LAM_FAC_I[Z1]. A control signal is then generated as a function of the corrected fuel mass to be metered MFF_COR and this is used to control the respective injection valve 34.

In addition to the regulator structure illustrated in the block circuit diagram in FIG. 2, corresponding regulator structures B_Z2 to B_Z4 for the respective further cylinders Z2 to Z4 are also provided for each further cylinder Z1 to Z4.

Alternatively a proportional element can also be configured in block B5.

A number of exemplary embodiments of programs for determining the sampled crankshaft angle CRK_SAMP are described below. The start of the respective programs preferably takes place close in time to start-up of the internal combustion engine.

Figure 3:
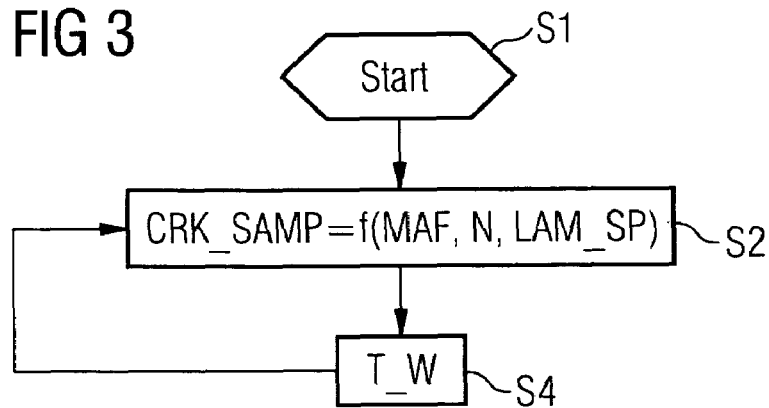
FIG. 3 shows a flow diagram of a first embodiment of a program for determining a sampled crankshaft angle.

A first embodiment of the program (FIG. 3) is started in a step S1. In a step S2 the sampled crankshaft angle CRK_SAMP is determined as a function of the air mass flow MAF into the respective cylinder, the speed N and the target value LAM_SP of the air/fuel ratio. The value thus determined of the sampled crankshaft angle CRK_SAMP is then supplied to block B2 for further processing. The program is then kept on hold for a predeterminable waiting period T_W in step S4, before step S2 is reprocessed. Alternatively the program can continue in step S4 for a predetermined crankshaft angle period. The sampled crankshaft angle CRK_SAMP is preferably first determined in step S2 as a function of the air mass flow MAF into the respective cylinder and the speed N and then corrected by means of a correction value, which is determined as a function of the target value LAM_SP of the air/fuel ratio. To this end corresponding performance data is preferably stored in the control facility 6, having been determined beforehand by tests on an engine test bed or by simulation.

Figure 4:
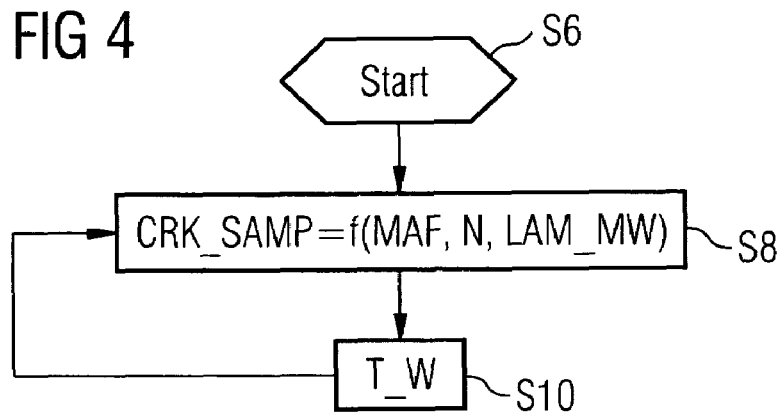
FIG. 4 shows a flow diagram of a second embodiment of a program for determining a sampled crankshaft angle.

In a second embodiment of the program (FIG. 4) a start takes place in a step S6. In a step S8 the sampled crankshaft angle CRK_SAMP is determined as a function of the air mass flow MAF into the respective cylinder, the speed N and the mean air/fuel ratio LAM_MW. The mean air/fuel ratio LAM_MW is preferably also filtered before determination of the sampled crankshaft angle CRK_SAMP using a low-pass, in order to filter out higher-frequency fluctuations, particularly close to the stoichiometric air/fuel ratio. The sampled crankshaft angle CRK_SAMP is determined in step S8 preferably as in step S2. Using the target value LAM_SP of the air/fuel ratio has the advantage that there is regularly no need for low-pass filtering. The sampled crankshaft angle CRK_SAMP can also be determined in a particularly simple manner by only differentiating whether or not the mean air/fuel ratio LAM_MW or the target value LAM_SP of the air/fuel ratio is in a narrow range around the stoichiometric air/fuel ratio.

Figure 5:
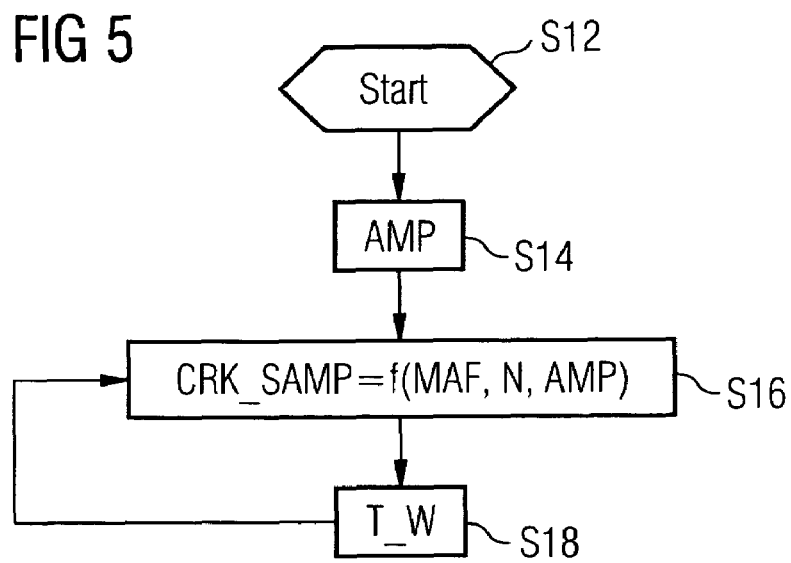
FIG. 5 shows a flow diagram of a third embodiment of a program for determining a sampled crankshaft angle.

A third embodiment of the program for determining the sampled crankshaft angle CRK_SAMP (FIG. 5) is started in a step S12. In a step S14 an ambient pressure AMP is detected or determined. An ambient pressure sensor can be provided for this purpose for example, detecting the pressure outside the internal combustion engine and thus detecting the current air pressure. If the ambient pressure sensor is not present however, the ambient pressure can be determined in a simple manner as a function of the measuring signal of the intake pipe sensor 16 in predetermined operating states. This can be done in a particularly simple manner, when the optionally present compressor 18 is not active, in other words is not compressing the air, and the throttle valve 11 is open so wide that the pressure drop across the throttle valve 11 is negligible. In this instance a very good approximate value of the ambient pressure AMP can be determined as a function of the measuring signal of the intake pipe pressure sensor 16.

In a step S16 the sampled crankshaft angle CRK_SAMP is determined as a function of the respective air mass flow MAF into the respective cylinder, the speed N and the ambient pressure AMP. This is preferably done according to the procedure in step S2.

The program is then kept on hold for the predetermined waiting period T_W in step S18.

In a fourth embodiment of the program for determining the sampled crankshaft angle CRK_SAMP (FIG. 6) a start takes place in a step S20. In a step S22 the sampled crankshaft angle CRK_SAMP is determined as a function of the air mass flow MAF into the respective cylinder, the speed N and the opening angle OG_WG of the bypass valve 51 to the turbine 42 of the exhaust gas turbocharger. This is also preferably done according to the procedure in step S2.

The program is then kept on hold in a step S24 for the predetermined waiting period T_W. Processing then continues again in step S22.

In a fifth embodiment of the program (FIG. 7) a start takes place in a step S26. In a step S28 the ambient pressure is detected. This is done according to the procedure in step S14.

In a step S30 the sampled crankshaft angle CRK_SAMP is determined as a function of the air mass flow MAF into the respective cylinder Z1 to Z4, the speed N, the ambient pressure AMP, the opening angle OG_WG of the bypass valve 51, and either the target value LAM_SP of the air/fuel ratio or the mean air/fuel ratio LAM_MW.

In step S30 the sampled crankshaft angle CRK_SAMP is preferably first determined as a function of the air mass flow MAF into the respective cylinder and the speed N, preferably by means of performance data and optionally corresponding performance data interpolation. Also at least one correction value is determined as a function of the ambient pressure AMP and/or the opening angle OG_WG of the bypass valve 51 and/or the target value LAM_SP of the air/fuel ratio and/or the mean air/fuel ratio LAM_MW. This is also preferably done by means of one or more sets of performance data and optionally performance data interpolation, the performance data preferably being determined beforehand by corresponding tests, for example on an engine test bed or by simulation.

The sampled crankshaft angle CRK_SAMP is then corrected by means of at least one correction value and supplied to block B2. The program is then kept on hold for the predetermined waiting period T_W in step S32, before processing is resumed in step S30.

The invention claimed is:

1. A method for detecting a cylinder-specific air/fuel ratio in an internal combustion engine having a plurality of cylinders, comprising:
   assigning a plurality of injection valves to the cylinders of the engine where the valves meter fuel;
   arranging an exhaust gas probe in an exhaust gas tract of the engine;
   arranging a turbine bypass valve in the exhaust gas tract of the engine;
   sampling a crankshaft angle relative to a reference position of a piston of the respective cylinder; and
   detecting a measuring signal of the exhaust gas probe as a function of an opening angle of the bypass valve wherein:
      the measuring signal is characteristic of an air/fuel ratio in the respective cylinder of the engine, and
      the measuring signal is detected for the sampled crankshaft angle and assigned to the respective cylinder.

2. The method as claimed in claim 1, wherein the sampled crankshaft angle is determined as a function of an ambient pressure.

3. The method as claimed in claim 2, wherein the sampled crankshaft angle is determined as a function of a variable that characterizes the air/fuel ratio in the respective cylinder.

4. The method as claimed in claim 3, wherein the sampled crankshaft angle is determined as a function of whether the air/fuel ratio in the respective cylinder corresponds approximately to the stoichiometric air/fuel ratio.

5. An internal combustion engine, comprising:
   an engine block having a plurality of cylinders;
   a crank shaft arranged in the engine block;
   a piston arranged in each of the plurality of cylinders;
   a crankshaft position sensor that measures a crankshaft angle relative to a reference position of a piston of the respective cylinder;
   a cylinder head arranged on the engine block;
   a plurality of gas inlet valves arranged in the cylinder head;
   a plurality of gas outlet valves arranged in the cylinder head;
   a plurality of fuel injection valves where each injection valve is assigned to one of the plurality of cylinders of the engine;
   a turbine arranged in an exhaust tract of the engine;
   a turbine bypass valve arranged in the exhaust gas tract of the engine; and
   an exhaust gas probe arranged in the exhaust gas tract of the engine, wherein a measuring signal of the exhaust gas probe is measured as a function of an opening angle of the bypass valve where:
      the measuring signal is characteristic of an air/fuel ratio in the respective cylinder of the engine, and
      the measuring signal is detected for the sampled crankshaft angle and assigned to the respective cylinder.

6. The internal combustion engine as claimed in claim 5, wherein the sampled crankshaft angle is determined as a function of an ambient pressure.

7. The internal combustion engine as claimed in claim 6, wherein the sampled crankshaft angle is determined as a function of a variable that characterizes the air/fuel ratio in the respective cylinder.

8. The internal combustion engine as claimed in claim 7, wherein the sampled crankshaft angle is determined as a function of whether the air/fuel ratio in the respective cylinder corresponds approximately to the stoichiometric air/fuel ratio.

* * * * *